United States Patent [19]
Miyamoto et al.

[11] Patent Number: 5,737,301
[45] Date of Patent: Apr. 7, 1998

[54] LASER CONTROL FOR SETTING AVERAGE RECORDING POWER OF "1" EQUAL TO AVERAGE RECORDING POWER OF "0"

[75] Inventors: Harukazu Miyamoto, Kodaira; Kiyoshi Matsumoto, Chiba; Hisataka Sugiyama, Kodaira, all of Japan

[73] Assignee: Hitachi, Ltd., Tokyo, Japan

[21] Appl. No.: 657,771

[22] Filed: May 31, 1996

[30] Foreign Application Priority Data

Jun. 1, 1995 [JP] Japan ................... 7-134917

[51] Int. Cl.⁶ .................................................. G11B 7/125
[52] U.S. Cl. .................................. 369/116; 369/13
[58] Field of Search ............................... 369/13, 47, 48, 369/59, 116, 54

[56] References Cited

U.S. PATENT DOCUMENTS

| | | | |
|---|---|---|---|
| 5,321,672 | 6/1994 | Miyamoto et al. | 369/116 |
| 5,459,701 | 10/1995 | Tokita et al. | 369/116 |
| 5,544,137 | 8/1996 | Ohara | 369/557 |
| 5,555,236 | 9/1996 | Hasegawa | 369/116 |
| 5,577,019 | 11/1996 | Saito et al. | 369/116 |

FOREIGN PATENT DOCUMENTS 7-29239  1/1995  Japan .

*Primary Examiner*—David C. Nelms
*Assistant Examiner*—Kim-Kwok Chu
*Attorney, Agent, or Firm*—Fay, Sharpe, Beall, Fagan, Minnich & McKee

[57] ABSTRACT

An optical recording apparatus includes an optical system to focus a beam of light onto an optical recording medium; a laser source to generate the beam; a laser driver that modulates the output of the beam according to digital information to be recorded; and a controller that performs control in such a way that the average power per unit recording time of the beams used to record digital information "1" (or "0") and digital information "0" (or "1") onto the recording medium are virtually equal, and so that the peak power of the beams used to record the digital information "1" (or "0") and the digital information "0" (or "1") differ from each other.

10 Claims, 4 Drawing Sheets

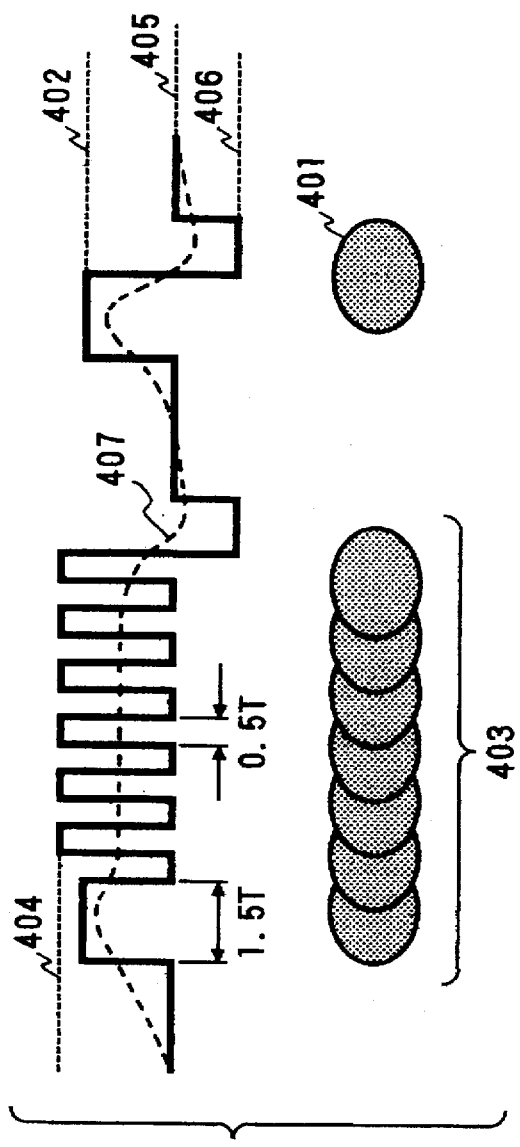
FIG. 4 PRIOR ART
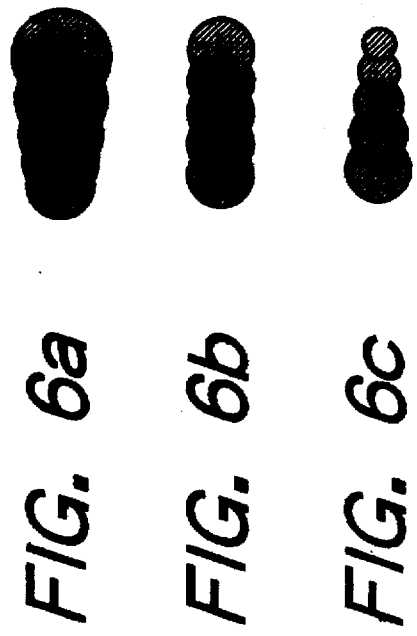
FIG. 6a
FIG. 6b
FIG. 6c

LASER CONTROL FOR SETTING AVERAGE RECORDING POWER OF "1" EQUAL TO AVERAGE RECORDING POWER OF "0"

BACKGROUND AND SUMMARY OF THE INVENTION

The present invention relates to an optical recording apparatus for recording information.

FIG. 5 shows an example configuration of a conventional magneto-optical recording and reproducing apparatus. A semiconductor laser 503 mounted on an optical head 501 and driven by a laser driver 502 emits a laser beam 504 which is collimated by a collimating lens 505. The parallel beam is then passed through a beam splitter 506 and focused by a lens 507 to form a light spot on a magneto-optical recording medium 508. The position of the light spot on the magneto-optical recording medium 508 is controlled by an optical spot actuator controller 509 that moves the lens 507 and/or the optical head 501. The reflected beam from the magneto-optical recording medium 508 is led by the beam splitter 506 to a light detection optical system 510, which generates a reproduction signal which is then processed by a reproducing circuit 511 to be converted into reproduced data. These controls are performed by a controller 512.

FIG. 4 shows an example waveform of laser pulses used in recording data in a mark edge recording scheme, disclosed for instance in Japan Patent Application Laid-Open No. 29239/1995. The mark edge recording scheme is a technique that represents information by the position of the mark edge.

Let the recorded information unit (channel clock interval, for example) be T. The shortest 2T mark 401 is recorded by a single pulse with a pulse width of 1.5 T and a first recording power 402. As for a longer mark 403 greater than 3 T, recording is made by using a pulse with a pulse width of 1.5 T and a first recording power 402, followed by a train of pulses at 0.5 T intervals, each having a 0.5 T pulse width and a second recording power 404. To eliminate thermal interferences between marks, a rest period is provided at the end of the mark where an assist power 405 is pulled down to a bottom power 406.

The above technology shown in FIG. 4, however, is not suited to form marks 1 T long according to the recording codes used in NRZ recording and 8/9 modulation that have the shortest mark shorter than 2 T. Moreover, because four recording power levels need to be controlled, a precise power control must be performed, making this conventional technology unsuitable for simplifying the apparatus. Further, with this technology, the average power 407 in clock cycle periods of the laser beam is not constant.

The object of this invention is to provide an optical recording apparatus that can perform high density recording by forming marks of desired lengths with precision without producing interference, even when using simple recording laser waveforms.

To achieve the above objective, this invention uses the following configuration.

(1) In an optical recording apparatus which includes an optical system to focus a laser beam on an optical recording medium and a laser source to generate a beam, and which records digital information on the optical recording medium, a laser driver modulates the output of the laser beam according to the digital information in such a way that the average intensity or power per unit recording time of the beam used to record digital information "1" (or "0") on the optical recording medium is roughly equal to that used to record digital information "0" (or "1") and so that the peak power of the beam when recording digital information "1" (or "0") on the recording medium differs from that when recording digital information "0" (or "1"). This makes the average powers of beams striking the recording mark portion and other portions equal, so that the influences of thermal interference (heat accumulation) can be eliminated completely, making it possible to form recording marks with high density and precision.

(2) The light pulse width when recording digital information "1" (or "0") is set narrower than that when recording digital information "0" (or "1"). This allows the marks to be formed with different peak powers while keeping the average powers equal.

(3) The light pulse width when recording digital information "0" (or "1") is set to almost two times that used when recording digital information "1" (or "0"). This eliminates the need to generate extremely high frequency pulses (short pulses), which in turn makes the apparatus suitable for high-speed recording.

(4) The peak beam power used to record digital information "1" (or "0") is set to almost two times that used to record digital information "0" (or "1").

(5) Let T0 and P0 stand for the light pulse width and power, respectively, when recording digital information "0" (or "1"), and T1 and P1 for the light pulse width and power when recording digital information "1" (or "0"). The following relation holds:

$$0.9 \leq T0 \times P0/(T1 \times P1) \leq 1.1$$

This makes it possible to form marks with differing peak powers while maintaining the average powers equal.

(6) The light pulse irradiation starting time when recording digital information "0" (or "1") is set earlier than that when recording digital information "1" (or "0"), and the light pulse irradiation ending time when recording digital information "0" (or "1") is set later than that when recording digital information "1" (or "0").

This eliminates thermal interference among marks and allows for mark forming with higher precision, contributing to high density recording. Further, because the thermal interference between marks can be reduced significantly, precise mark formation becomes possible.

(7) The length of time that elapses from the light pulse irradiation starting time when recording digital information "0" (or "1") to the light pulse irradiation starting time when recording digital information "1" (or "0") is set shorter than the length of time that elapses from the light pulse irradiation ending time when recording digital information "1" (or "0") to the light pulse irradiation ending time when recording digital information "0" (or "1").

This makes it possible to eliminate thermal interference between marks, enhancing the precision of mark formation and therefore the recording density.

In the above configuration, it is possible to raise all of the recording power levels by a certain amount of DC power. Further, the digital information may have its original data subjected to an appropriate precoding processing before being used.

Because in this invention the average light powers per unit recording time of beams applied to record digital information "1" (or "0") and digital information "0" (or "1") are made almost the same, the average powers of beams applied to the recording mark portion and to other portions are equal, making it possible to eliminate the influences of accumulated heat completely.

Further, the peak power of light when recording digital information "1" (or "0") on the recording medium is made to differ from the light peak power when recording digital information "0" (or "1"). This allows the instantaneous temperatures on the medium when recording digital information "1" (or "0") and when recording digital information "0" ("1") to differ from each other, so that it is possible to form recording marks according to the digital information while removing effects of accumulated heat.

BRIEF DESCRIPTION OF THE DRAWINGS

FIG. 4 is a waveform diagram showing an example recording optical waveform used in a conventional optical recording apparatus;

FIGS. 6a–6c are schematic diagram showing the working principle of this invention.

DETAILED DESCRIPTION OF THE INVENTION

Now, the working principle, functions and effects of this invention will be described below in conjunction with one embodiment of this invention.

Figure 1:
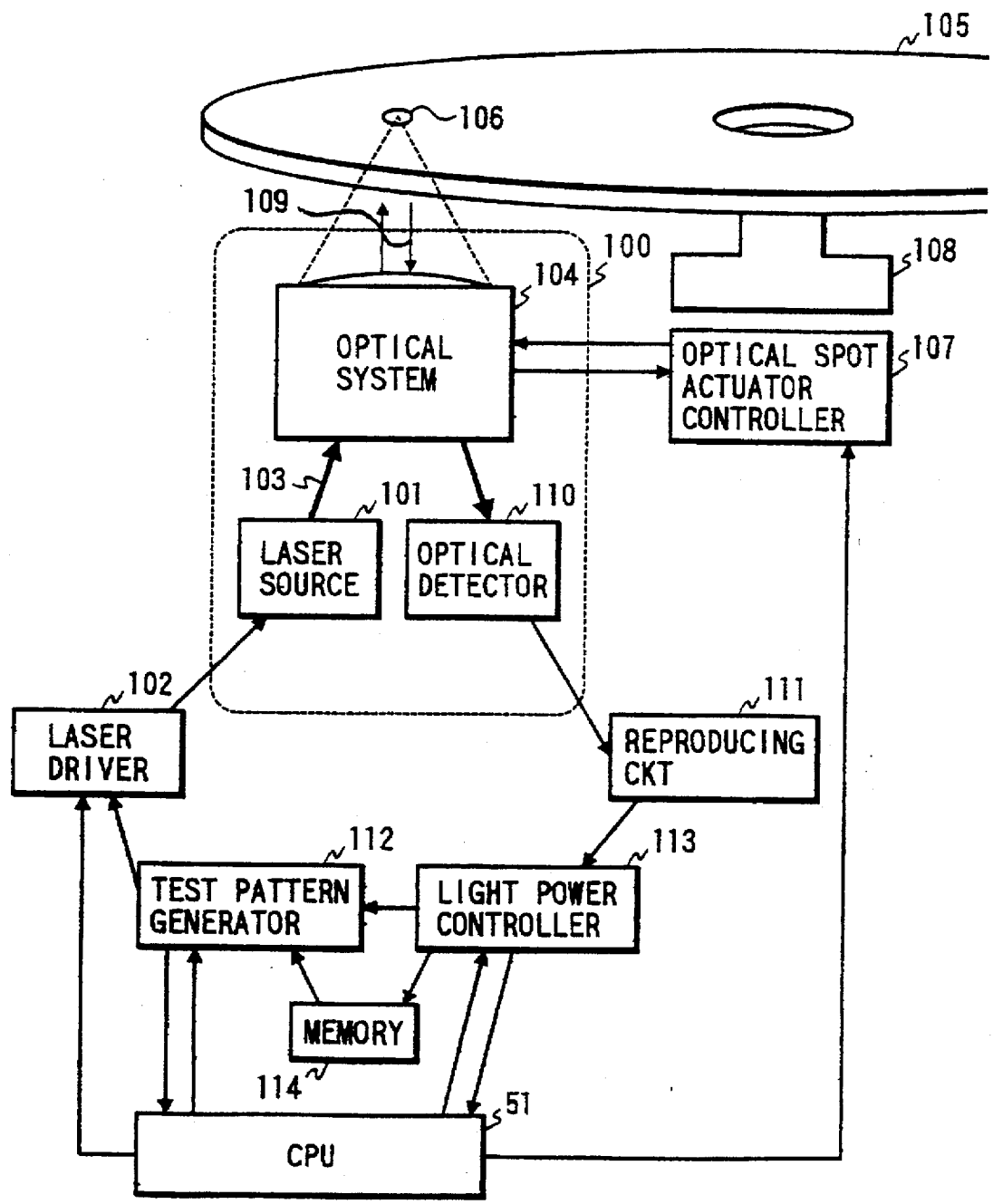
FIG. 1 is a block diagram of the optical recording apparatus as one embodiment of this invention.

FIG. 1 shows an example configuration of the optical recording apparatus of this invention. This embodiment uses a semiconductor laser with a wavelength of 680 nm as the laser source 101. The power of the semiconductor laser is controlled by a laser driver 102. A laser beam 103 emitted from the laser source 101 is focused on an optical recording medium 105 by an optical system 104, which has at least one objective lens. In this example, the aperture ratio of the objective lens that converges the laser beam 103 onto the optical recording medium 105 is set at 0.55. Hence, the diameter of the light spot 106 on the optical recording medium 105 is 1.1 µm. The light spot 106 can be moved to any desired position on the optical recording medium 105 by an optical spot actuator controller 107.

In this embodiment, the optical spot actuator controller 107 controls an actuator—which drives the objective lens— to perform an automatic focus control and an automatic tracking control. The optical spot actuator controller 107 can also perform rough positioning of the light spot by moving the optical head 100, which mounts at least the optical system 104. For these controls, the optical spot actuator controller 107 performs a feedback control by using detection signals of reflected light from the magneto-optical recording medium 105. The magneto-optical recording medium 105 is shaped like a disc and is rotated by a spindle motor 108. The reflected light 109 from the light spot 106 is led toward a photodetector 110 by a polarizing beam splitter in the optical system 104. The photodetector 110 comprises a polarization beam analysis means such as a polarizer, and a photodetector means that transforms light into electric signals. The reproduced signal converted into electric signals by the photodetector 110 is introduced into a reproducing circuit 111 where the recorded information is demodulated.

Now, in the configuration of FIG. 1, how the recording operation is performed will be explained. In recording information, the laser beam 103, whose power is modulated into a waveform by the laser driver 102 as detailed later, is emitted to the optical recording medium 105 to form a light spot 106.

In this embodiment, the laser power to record "1" is 5 mW at the innermost periphery and 7 mW at the outermost periphery of a 5.25-inch disc revolving at 3600 rpm. The pulse width of the laser beam is 14 nsec at the inner periphery of the disc and 7 nsec at the outer periphery. The power of the laser beam used to record "0" is 2.5 mW at the innermost periphery and 3.5 mW at the outermost periphery. The pulse width is 28 nsec at the innermost periphery and 14 nsec at the outermost periphery.

Figure 2:
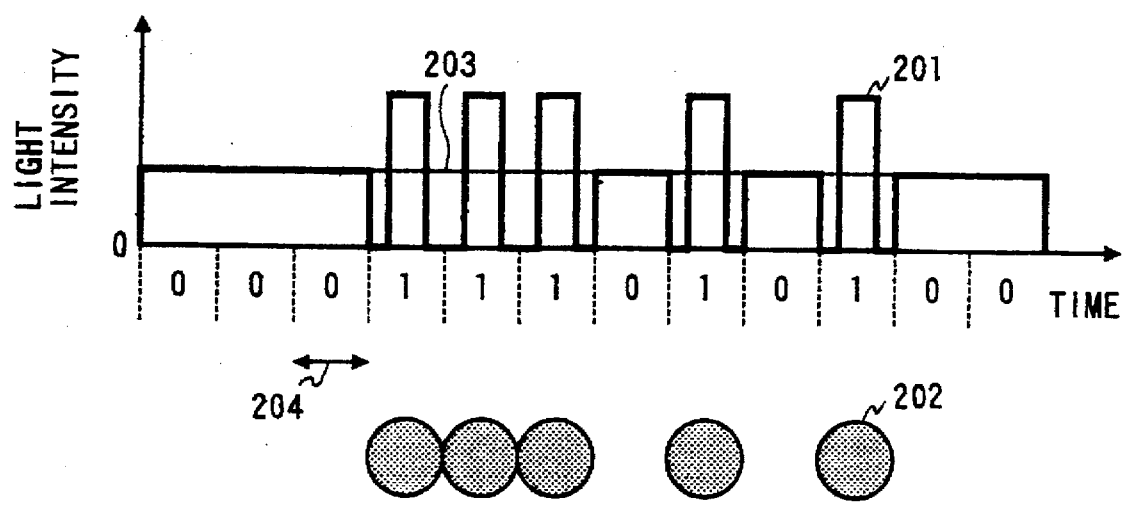
FIG. 2 is a waveform diagram showing an example recording optical waveform used in the optical recording apparatus of this invention.

FIG. 2 shows a recording waveform 201 of the laser beam and a recording mark 202 formed by the laser beam at the innermost periphery of the disc.

In this embodiment, the width of the pulse used to record information "0" coincides with the cycle of the information recording unit (channel clock). This cycle is referred to as a unit recording time 204. When "0" is recorded successively, the beam is emitted continuously. The length of the shortest mark formed is 0.32 µm. In this example, because ⅝ modulation is used, the line recording density is 0.35 µm/bit. In this invention, the timing of emitting the pulse to record "1" is delayed 5 nsec at the innermost periphery and 2.5 nsec at the outermost periphery from the timing of the "0" recording pulse. Hence, in this embodiment, the average recording power 203 per unit recording time of the beam used to record "1" and that used to record "0" are substantially equal. That is, the average recording power is uniform whereas the average power 407 in the conventional apparatus of FIG. 4 is not; therefore, this invention has the advantage of enhanced ease with which to perform thermal control of the medium during the recording operation.

Figure 3:
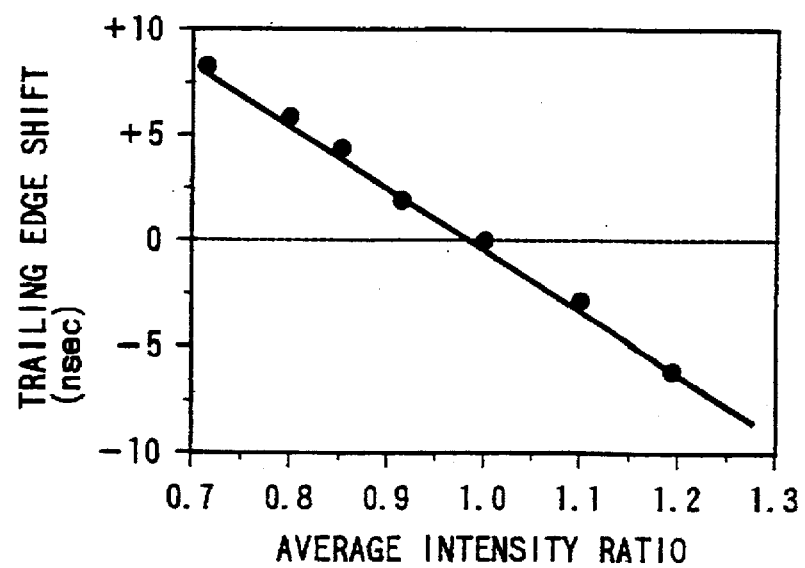
FIG. 3 is a graph showing the effect of this invention.
Figure 5:
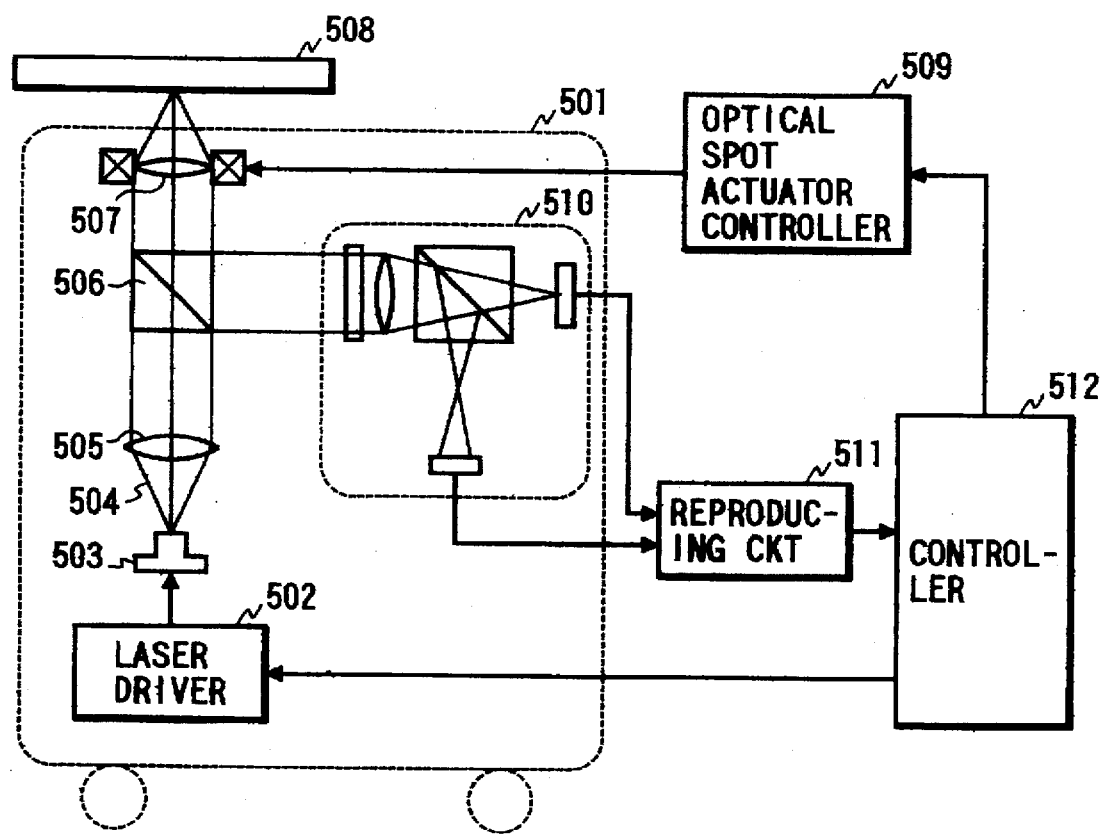
FIG. 5 is a block diagram showing the configuration of the conventional optical recording apparatus.

FIG. 3 shows the relation between the ratio of average recording powers for recording "1" and "0" at the innermost periphery of the disc and the shift of the rear edge of a recording mark (deviation from the ideal length of a recording mark). FIG. 6 shows recording marks formed under a variety of conditions.

When the average power ratio is smaller than unity, that is, when the average power used to record "0" is small, the average recording power rises as the recording power for "1" is irradiated, progressively increasing the heat accumulated in the medium. Thus, the recording mark will be as shown in FIG. 6a, with the mark becoming larger toward the rear. Hence, the rear edge shifts toward the rear side (in FIG. 3, toward the plus side).

When the average power ratio is greater than unity, the reverse is the case. As shown in FIG. 6c, the rear edge shifts toward the front side (in FIG. 3, toward the negative side).

To produce an appropriate size of recording mark as shown in FIG. 6b and keep the shift of the recording mark within about 10% of the information unit length (28 nsec), the power ratio should be set in the range between 0.9 and 1.1.

Because the beam power required to record an appropriate size of mark depends on the ambient temperature of the apparatus, the size of the mark to be recorded will differ as shown in FIGS. 6a and 6c unless the beam power is controlled properly according to the environment. If the mark size changes with the ambient temperature, some marks may fail to be erased, deteriorating the signal quality. Hence, to solve this problem, this invention employs a trial write control scheme.

To realize the trial write control scheme, the configuration of FIG. 1 is provided with three blocks—a test pattern generator 112, a beam power determination circuit 113, and a memory 114. Details of the trial write scheme may be found in Japan Patent Application Laid-Open No. 295439/1994.

The test pattern generator 112 controls the laser driver 102 to change stepwise the power of the beam while it is applied to the magneto-optical recording medium 105. In this way, the trial mark is formed according to the power of beam. Next, the trial mark recorded in this manner is reproduced by the reproducing circuit to evaluate the reproduced signal. To put it more concretely, the beam power determination circuit 113 compares the reproduced signal from a short period mark and the reproduced signal from a long period mark and checks for the light power at which the center levels of these marks agree, thus determining the optimum power of the recording beam. The optimum beam power is stored in the memory 114.

When the ambient temperature changes or the recording medium is replaced, such a trial write control scheme is preferably performed at certain intervals (in this case 10 minutes) after the medium is replaced. It is also preferred that the trial write control be performed at a plurality of locations corresponding to a variety of positions in the magneto-optical recording medium. Hence, in this example, the beam power memory means stores a plurality of beam powers simultaneously that correspond to various positions in the medium.

In addition to the magneto-optical recording medium, the optical recording mediums applicable in this invention may include a phase change type recording medium, a holy type recording medium or any other types as long as they utilize a temperature rise on the medium in recording. These mediums can take advantage of this invention.

Because the average powers of beams applied to the recording mark portion and other portions are equal, it is possible to form recording marks corresponding to the digital information while completely eliminating influences of accumulated heat. This in turn allows minuscule recording marks to be formed with precision, realizing high density optical recording.

We claim:

1. An optical recording apparatus for recording digital information onto an optical recording medium, comprising:

an optical system to focus a beam of light onto the optical recording medium;

a laser source to generate the beam;

a laser driver to modulate an output of the beam according to the digital information; and a controller which performs control in such a way that average powers per unit recording time of the beams used to record digital information "1" (or "0") and digital information "0" (or "1") onto the recording medium are almost equal, and so that peaks of the beam power used to record digital information "1" (or "0") and digital information "0" (or "1") onto the recording medium differ from each other.

2. An optical recording apparatus according to claim 1, wherein the pulse width of the beam used to record the digital information "1" (or "0") is narrower than that of the beam used to record the digital information "0" (or "1").

3. An optical recording apparatus according to claim 2, wherein the pulse width of the beam used to record the digital information "0" (or "1") is almost two times that of the beam used to record the digital information "1" (or "0").

4. An optical recording apparatus according to claim 1, wherein the peak beam power used to record the digital information "1" (or "0") is almost two times that used to record the digital information "0" (or "1").

5. An optical recording apparatus according to claim 1, wherein the following relationship holds:

$$0.9 \leq T0 \times P0/(T1 \times P1) \leq 1.1$$

where T0 and P0 are the pulse width and beam power used to record the digital information "0" (or "1") and T1 and P1 are the pulse width and beam power used to record the digital information "1" (or "0").

6. An optical recording apparatus according to claim 1, wherein an irradiation start time for the beam pulse used to record the digital information "0" (or "1") is set earlier than an irradiation start time for the beam pulse used to record the digital information "1" (or "0"), and an irradiation end time for the beam pulse used to record the digital information "0" (or "1") is set later than an irradiation end time for the beam pulse used to record the digital information "1" (or "0").

7. An optical recording apparatus according to claim 6, wherein a length of time which elapses from the irradiation starting of the beam pulse used to record the digital information "0" (or "1") to the irradiation starting of the beam pulse used to record the digital information "1" (or "0") is set shorter than a length of time which elapses from the irradiation ending of the beam pulse used to record the digital information "1" (or "0") to the irradiation ending of the beam pulse used to record the digital information "0" (or "1").

8. An optical recording method comprising the steps of:

applying an energy beam modulated according to information to be recorded to a plurality of unit recording areas of an optical recording medium to cause each of the unit recording areas to hold information;

wherein average powers of the energy beams to are at least almost equal at both unit recording areas to be recorded "1" and "0".

9. An optical recording method for recording digital information, comprising the steps of:

applying an energy beam modulated according to digital information to be recorded in unit recording areas of an optical recording medium to cause each of the unit recording areas to represent either a "1" or "0" state;

wherein average powers of the energy beams applied to the unit recording areas are at least almost equal.

10. An optical recording method for recording digital information, comprising the steps of:

modulating a beam according to a clock signal; and applying the modulated beam to an optical recording medium to record digital information;

wherein the beam is so modulated that a peak power of the beam used to record digital information "1" (or "0") and a peak power of the beam used to record digital information "0" (or "1") differ from each other, and so that average powers within a clock cycle of the beams applied to the optical recording medium are at least almost equal.

* * * * *